US008955004B2

United States Patent
Scurtu et al.

(10) Patent No.: US 8,955,004 B2
(45) Date of Patent: *Feb. 10, 2015

(54) RANDOM GENERATION OF BEACONS FOR VIDEO ANALYTICS

(75) Inventors: Tudor Scurtu, Piatra Neamt (RO); George Horia Galatanu, Bucharest (RO); James Anderson Moorer, Panacea, FL (US)

(73) Assignee: Adobe Systems Incorporated, San Jose, CA (US)

( * ) Notice: Subject to any disclaimer, the term of this patent is extended or adjusted under 35 U.S.C. 154(b) by 553 days.

This patent is subject to a terminal disclaimer.

(21) Appl. No.: 13/246,167

(22) Filed: Sep. 27, 2011

(65) Prior Publication Data

US 2013/0077935 A1 Mar. 28, 2013

(51) Int. Cl.
```
H04H 60/32    (2008.01)
H04N 21/472   (2011.01)
H04N 21/262   (2011.01)
H04H 60/59    (2008.01)
H04N 21/658   (2011.01)
H04H 60/31    (2008.01)
H04N 21/25    (2011.01)
H04N 21/845   (2011.01)
H04N 21/81    (2011.01)
G06F 17/30    (2006.01)
H04N 21/442   (2011.01)
```

(52) U.S. Cl.
CPC ... *H04N 21/47202* (2013.01); *H04N 21/26258* (2013.01); *H04H 60/59* (2013.01); *H04N 21/6582* (2013.01); *H04H 60/31* (2013.01); *H04N 21/252* (2013.01); *H04N 21/8456* (2013.01); *H04N 21/812* (2013.01); *G06F 17/3082* (2013.01); *H04N 21/44222* (2013.01)
USPC .......... 725/14; 725/87; 725/91; 725/103; 725/109; 725/110

(58) Field of Classification Search
USPC .......... 725/14, 87, 91, 103, 109–110
See application file for complete search history.

(56) References Cited

U.S. PATENT DOCUMENTS

| 6,862,497 B2 | 3/2005 | Kemp et al. |
| 6,947,978 B2 | 9/2005 | Huffman et al. |
| 7,139,764 B2 * | 11/2006 | Lee .................... 1/1 |

(Continued)

OTHER PUBLICATIONS

"Notice of Allowance", U.S. Appl. No. 13/246,208, Apr. 16, 2014, 4 pages.

(Continued)

*Primary Examiner* — Mulugeta Mengesha
(74) *Attorney, Agent, or Firm* — Wolfe—SBMC (57) ABSTRACT

At least one of a probability density for a video and a granularity mapping for the video based upon the probability density are generated at an analytics server. The probability density is calculated according to a predetermined set of points in the video and a pseudo-randomly generated set of points in the video. The probability density is non-degenerate. The granularity mapping for the video provides a mapping of the probability density to the video. The at least one of the probability density and the granularity mapping are sent from the analytics server to a video content server so that the video content server sends the video and the at least one of the probability density, and the granularity mapping to each of a plurality of clients. A set of beacons is generated by the each of the plurality of clients according to the probability density and the granularity mapping.

21 Claims, 9 Drawing Sheets

(56) References Cited

U.S. PATENT DOCUMENTS

| | | |
|---|---|---|
| 7,574,454 B2 * | 8/2009 | Lee ........................................ 1/1 |
| 7,616,555 B2 | 11/2009 | Hart |
| 7,626,969 B2 | 12/2009 | Hart et al. |
| 8,009,863 B1 | 8/2011 | Sharma et al. |
| 8,514,907 B2 * | 8/2013 | Wright et al. ................ 375/132 |
| 8,782,175 B2 | 7/2014 | Scurtu et al. |
| 2002/0087666 A1 | 7/2002 | Huffman et al. |
| 2003/0135513 A1 | 7/2003 | Quinn |
| 2004/0039483 A1 | 2/2004 | Kemp et al. |
| 2004/0267770 A1 * | 12/2004 | Lee ............................. 707/100 |
| 2006/0288031 A1 * | 12/2006 | Lee ............................. 707/101 |
| 2007/0050423 A1 | 3/2007 | Whalen et al. |
| 2008/0080429 A1 | 4/2008 | Hart |
| 2008/0084858 A1 | 4/2008 | Hart et al. |
| 2008/0307454 A1 * | 12/2008 | Ahanger et al. ................ 725/36 |
| 2009/0158155 A1 | 6/2009 | Quinn |
| 2010/0115060 A1 * | 5/2010 | Julia et al. .................... 709/219 |
| 2011/0090959 A1 | 4/2011 | Wiegand et al. |
| 2012/0254333 A1 | 10/2012 | Chandramouli et al. |
| 2012/0311083 A1 * | 12/2012 | Julia et al. .................... 709/217 |
| 2013/0080591 A1 | 3/2013 | Scurtu et al. |
| 2013/0107956 A1 | 5/2013 | Muijs et al. |
| 2013/0108183 A1 | 5/2013 | Bruls et al. |
| 2013/0138428 A1 * | 5/2013 | Chandramouli et al. ......... 704/9 |

OTHER PUBLICATIONS

"Non-Final Office Action", U.S. Appl. No. 13/246,208, Jan. 9, 2014, 9 pages.

* cited by examiner

RANDOM GENERATION OF BEACONS FOR VIDEO ANALYTICS

BACKGROUND

1. Field

This disclosure generally relates to video delivery. More particular, the disclosure relates to video analytics of video delivery.

2. General Background

Accurately measuring video consumption is an integral part of the online video business. For example, measuring video consumption allows publishers to fine tune their content and optimize the display of advertisements. Online video consumption reports help publishers understand what users are interested in viewing at any given time depending on their geographic location. This information is utilized to help determine the ideal points in the video content to insert advertisements and also which advertisements viewers prefer and the ones they avoid. In particular, many videos have various drop-off points at which users terminate a video. For example, a popular video may have a common drop-off point of the credits at the end of the video since many viewers will watch the whole video, but may choose to drop off when the credits are shown. As another example, a video may have a common drop-off point of particular type of scene such as the scene after an action portion of the video at which point some users may terminate the video.

Measuring when a user starts playing a video may be accomplished by providing a notification to an analytics server at the beginning of a video. However, measuring when the user stops playing the video is difficult. This difficulty arises from users typically closing a browser tab to stop watching the video. Such an abrupt termination results in no function call being made to the analytics server because the player task that would have sent the notification to the analytics server has been terminated. Since the video player itself has to be modular, self-contained, and easily hosted on different websites, there is no practical way to enforce any webpage level mechanisms that would notify the server of the termination of the video.

Current approaches have attempted to place code in a video player that communicates with the analytics server frequently over predetermined regular fixed time intervals, e.g., two second time intervals, to indicate that a user is still watching a video. To obtain an acceptable level of accuracy, such communications have to occur every few seconds. However, such approaches are too resource intensive as millions of people may be watching a video at the same time. As a result, the analytics server may receive millions of responses every few seconds. The operating and maintenance costs of such configurations is high given the load placed on the analytics server under such conditions. Further, content providers that provide analytics solutions that can handle such loads typically have to allocate large amounts of resources and charge customers high costs. Accordingly, considering the large number of views that videos published over the internet amass, such approaches generate an unfeasible amount of network calls to the centralizing server, which incur high costs for the hosts. Given these conditions, notifications are typically sent at regular intervals proportional to the video length, which results in an inaccurate record that is not very useful for the publishers. Finer reports can be provided on demand, but the high logistical and technological costs are reflected upon the customer.

SUMMARY

In one aspect of the disclosure, a computer program product is provided. The computer program product includes a computer useable medium having a computer readable program. The computer readable program when executed on a computer causes the computer to generate, at an analytics server, at least one of a probability density for a video and a granularity mapping for the video based upon the probability density. The probability density is calculated according to a predetermined set of points in the video and a pseudo-randomly generated set of points in the video. The probability density is non-degenerate. The granularity mapping for the video provides a mapping of the probability density to the video. In addition, the computer readable program when executed on the computer causes the computer to send, from the analytics server to a video content server, the at least one of the probability density and the granularity mapping so that the video content server sends the video and the at least one of the probability density, and the granularity mapping to each of a plurality of clients, the video content server storing the video. The computer readable program when executed on the computer causes the computer to receive, at the analytics server from the each of the plurality of clients, a set of beacons generated by the each of the plurality of the clients according to the at least one of the probability density and the granularity mapping during playback of the video based on a duration of the playback by the each of the plurality of the clients.

In another aspect of the disclosure, a process is provided. The process generates, at an analytics server, at least one of a probability density for a video and a granularity mapping for the video based upon the probability density. The probability density is calculated according to a predetermined set of points in the video and a pseudo-randomly generated set of points in the video. The probability density is non-degenerate. The granularity mapping for the video providing a mapping of the probability density to the video. In addition, the process sends, from the analytics server to a video content server, the at least one of the probability density and the granularity mapping so that the video content server sends the video and the at least one of the probability density, and the granularity mapping to each of a plurality of clients, the video content server storing the video. The process also receives, at the analytics server from the each of the plurality of clients, a set of beacons generated by the each of the plurality of the clients according to the at least one of the probability density and the granularity mapping during playback of the video based on a duration of the playback by the each of the plurality of the clients.

In yet another aspect of the disclosure, a system is provided. The system includes a processor that generates at least one of a probability density for a video and a granularity mapping for the video based upon the probability density. The probability density is calculated according to a predetermined set of points in the video and a pseudo-randomly generated set of points in the video. The probability density is non-degenerate. The granularity mapping for the video provides a mapping of the probability density to the video. Further, the system includes a transmission module that sends the probability density and the granularity mapping to a video content server so that the video content server sends the video and the at least one of the probability density and the granularity mapping to each of a plurality of clients. The video content server stores the video. In addition, the system includes a reception module that receives, from the each of the plurality of clients, a set of beacons generated by the each of the plurality of the clients according to the at least one of the probability density and the granularity mapping during playback of the video based on a duration of the playback by the each of the plurality of the clients.

In another aspect of the disclosure, a computer program product is provided. The computer program product includes a computer useable medium having a computer readable program. The computer readable program when executed on a computer causes the computer to generate, at an analytics server, at least one of a probability density for a video and a granularity mapping for the video based upon the probability density. The probability density is calculated according to a predetermined set of points in the video and a pseudo-randomly generated set of points in the video. The probability density is non-degenerate. The granularity mapping for the video provides a mapping of the probability density to the video. Further, the computer readable program when executed on the computer causes the computer to initiate, at the analytics server, a sampling session. In addition, the computer readable program when executed on the computer causes the computer to send, from the analytics server to each of a plurality of clients, the video. The computer readable program when executed on the computer causes the computer to receive, at the analytics server from the each of the plurality of clients, a set of beacons generated by the each of the plurality of the clients according to the at least one of the probability density and the granularity mapping during playback of the video based on a duration of the playback by the each of the plurality of the clients.

In another aspect of the disclosure, a computer program product is provided. The computer program product includes a computer useable medium having a computer readable program. The computer readable program when executed on a computer causes the computer to generate, at an analytics server, at least one of an initial probability density for a video and an initial granularity mapping for the video based upon the initial probability density. The initial probability density is calculated according to a set of points in the video. The initial granularity mapping for the video provides a mapping of the initial probability density to the video. Further, the computer readable program when executed on the computer causes the computer to initiate, at the analytics server, an initial sampling session. In addition, the computer readable program when executed on the computer causes the computer to send, from the analytics server to a video content server, the at least one of the initial probability density and the initial granularity mapping so that the video content server sends the video and the at least one of the initial probability density and the initial granularity mapping to each of a plurality of clients. The video content server stores the video. The computer readable program when executed on the computer causes the computer to receive, at the analytics server from the each of the plurality of clients, a set of beacons generated by the each of the plurality of the clients according to the at least one of the initial probability density and the initial granularity mapping during playback of the video based on a duration of the playback by the each of the plurality of the clients. Further, the computer readable program when executed on the computer causes the computer to generate at least one of an updated probability density and an updated granularity mapping based upon the updated probability density such that a quantity of beacons in the set of beacons is modified.

In yet another aspect of the disclosure, a process is provided. The process generates, at an analytics server, at least one of an initial probability density for a video and an initial granularity mapping for the video based upon the initial probability density. The initial probability density is calculated according to a set of points in the video. The initial granularity mapping for the video provides a mapping of the initial probability density to the video. Further, the process initiates, at the analytics server, an initial sampling session. In addition, the process sends, from the analytics server to a video content server, the at least one of the initial probability density and the initial granularity mapping so that the video content server sends the video and the at least one of the initial probability density and the initial granularity mapping to each of a plurality of clients. The video content server stores the video. The process also receives, at the analytics server from the each of the plurality of clients, a set of beacons generated by the each of the plurality of the clients according to the at least one of the initial probability density and the initial granularity mapping during playback of the video based on a duration of the playback by the each of the plurality of the clients. Further, the process generates at least one of an updated probability density and an updated granularity mapping based upon the updated probability density such that a quantity of beacons in the set of beacons is modified.

In another aspect of the disclosure, a system is provided. The system includes a processor that generates at least one of an initial probability density for a video and an initial granularity mapping for the video based upon the initial probability density, initiates an initial sampling session, and generates at least one of an updated probability density and an updated granularity mapping based upon the updated probability density such that a quantity of beacons in the set of beacons is modified. The initial probability density is calculated according to a set of points in the video. The initial granularity mapping for the video provides a mapping of the initial probability density to the video. Further, the system includes a transmission module that sends the at least one of the initial probability density and the initial granularity mapping to a video content server so that the video content server sends the video and the at least one of the initial probability density and the initial granularity mapping to each of a plurality of clients. The video content server stores the video. In addition, the system includes a reception module that receives, from the each of the plurality of clients, a set of beacons generated by the each of the plurality of the clients according to the at least one of the initial probability density and the initial granularity mapping during playback of the video based on a duration of the playback by the each of the plurality of the clients.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A video analytics configuration is provided to accurately measure video consumption while minimizing communication between a client and analytics server. Beacons, i.e., notifications from the client to the analytics server, are randomly generated according to a non-degenerate probability distribution. The notifications may be HTTP notifications, function calls, metadata, data, or the like. Statistical sampling is utilized to select sample points in the video at which the client sends beacons to the analytics server. Some of the sample points may also be predetermined. Statistical sampling selects a relevant subset and, based on that subset's characteristics, infers characteristics of the entire set. Accordingly, statistical sampling is utilized to reduce the number of beacons sent from the client to the analytics server. In one embodiment, a relatively small number of beacons is sent from the client to the analytics server at pseudo-random points in a video. The analytics server keeps track of the last received beacon and of the next expected beacon for each video view session. The absence of a beacon indicates the termination of the view session by the user. The drop-off may be estimated by selecting a point between the last point when a beacon was received and the next point at which a beacon is expected. The maximum estimated drop-off error may be calculated by determining the maximum value difference between the interval ends and the estimate. The maximum estimated drop-off error $\epsilon=\max(\text{estimate}-\text{last}, \text{next}-\text{last})$. Further, the total maximum error E is the sum of all drop-off estimate errors, i.e., $E=\Sigma_{view}\epsilon=\Sigma_{view}\max(\text{estimate}_{view}-\text{last}_{view}, \text{next}_{view}-\text{estimate}_{view})$. The total mean error is the total maximum error divided by two, i.e., $\overline{E}=E/2$.

A sampling session is a chronological grouping of video views and their associated beacons on the analytics server. With respect to each video, a sampling session has its own probability density, granularity mapping, and beacon record. When the analytics server decides that it has enough data in the sampling session, it evaluates data from the beacons, generates estimated drop-off points and adds them to the total record for the video, which is the sum of all previous sampling session records. A new sampling session is then initialized for the video and the probability density and/or granularity mapping are updated. These updated components are sent to the video content servers that host the respective video. In one embodiment the data is added to the total beacon record.

An initial reduction in the number of calls is achieved by considering only a finite subset of points in the video in which beacons may be generated. By controlling the distribution of the beacons, the number of calls sent to the server may be reduced.

A computationally efficient method of generating video consumption reports is to group video views for the same video in chronologically continuous sampling sessions. These sampling sessions should have a maximum number of views and a maximum duration. The sessions should include a large enough number of video views to be considered relevant. At the end of each sampling session for a specific video, the partial results are interpreted and added to the general results. A new session may then be initiated.

Figure 1:
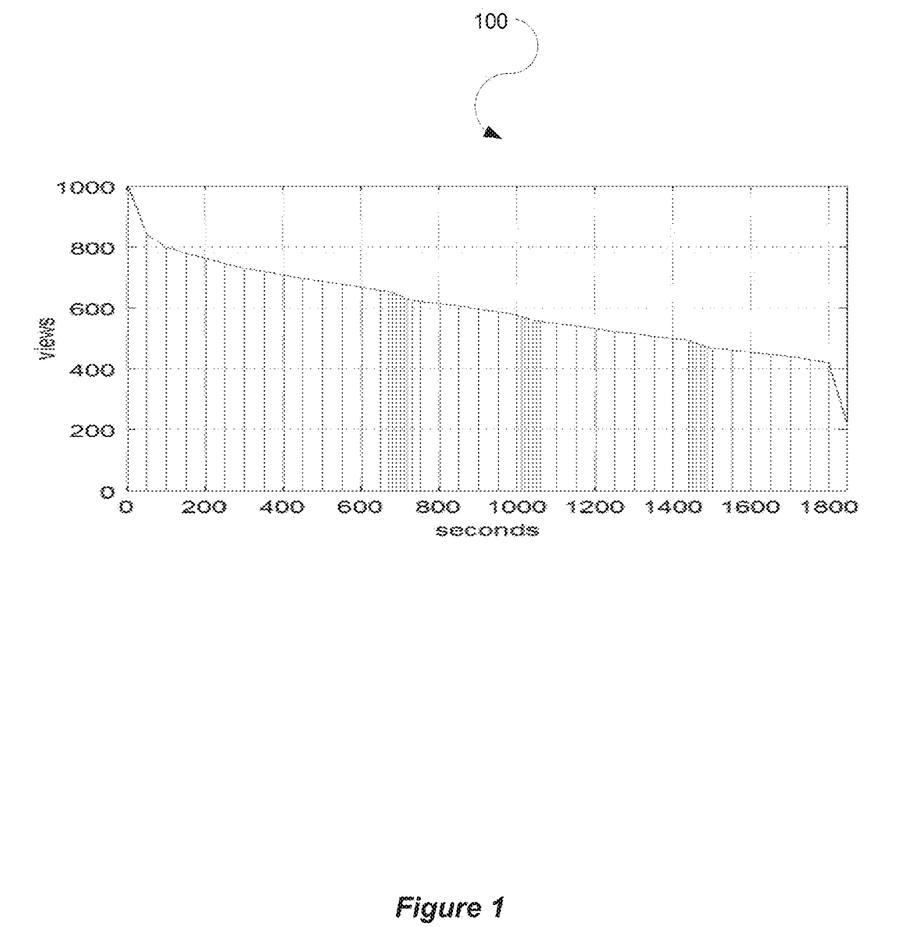
FIG. 1 illustrates an example of a video consumption record that indicates the granularity of possible beacon generation points.

FIG. 1 illustrates an example of a video consumption record 100 that indicates the granularity of possible beacon generation points. The y-axis indicates the number of views, and the x-axis indicates the time. Beacons are generated at certain times. In one embodiment, a set mandatory beacons and a set of pseudo-random beacons may be utilized. Examples of mandatory beacons include the start of the video, after the opening credits, before the closing credits, selected points in commercials, etc. In another embodiment, not mandatory beacons, i.e., predetermined beacons, are utilized. All of the beacons may be pseudo-randomly generated. Accordingly, the predetermined set of beacons may be a null set.

To accurately determine the viewing behavior for a certain section of the video, the sampling sessions have to be large enough so that two consecutive sessions transmitting beacons will not modify the relative shape of the view record for that section. As illustrated in FIG. 1, users tend to view only certain sections and then terminate the view session, resulting in spikes in declines in the number of views.

A rigid periodic sampling or a completely random beacon generation strategy may place beacons in sections of the video that users do not watch, which results in a reduction in the number of beacons sent during the sections of the video that users actually view. As a result, large intervals between the relevant beacons may occur, which results in a high drop-off estimate error. To accurately estimate the exact drop-off point, beacons are sent with a high frequency during the sections where users usually drop off, which maximizes the information gain for those sections.

Figure 2:
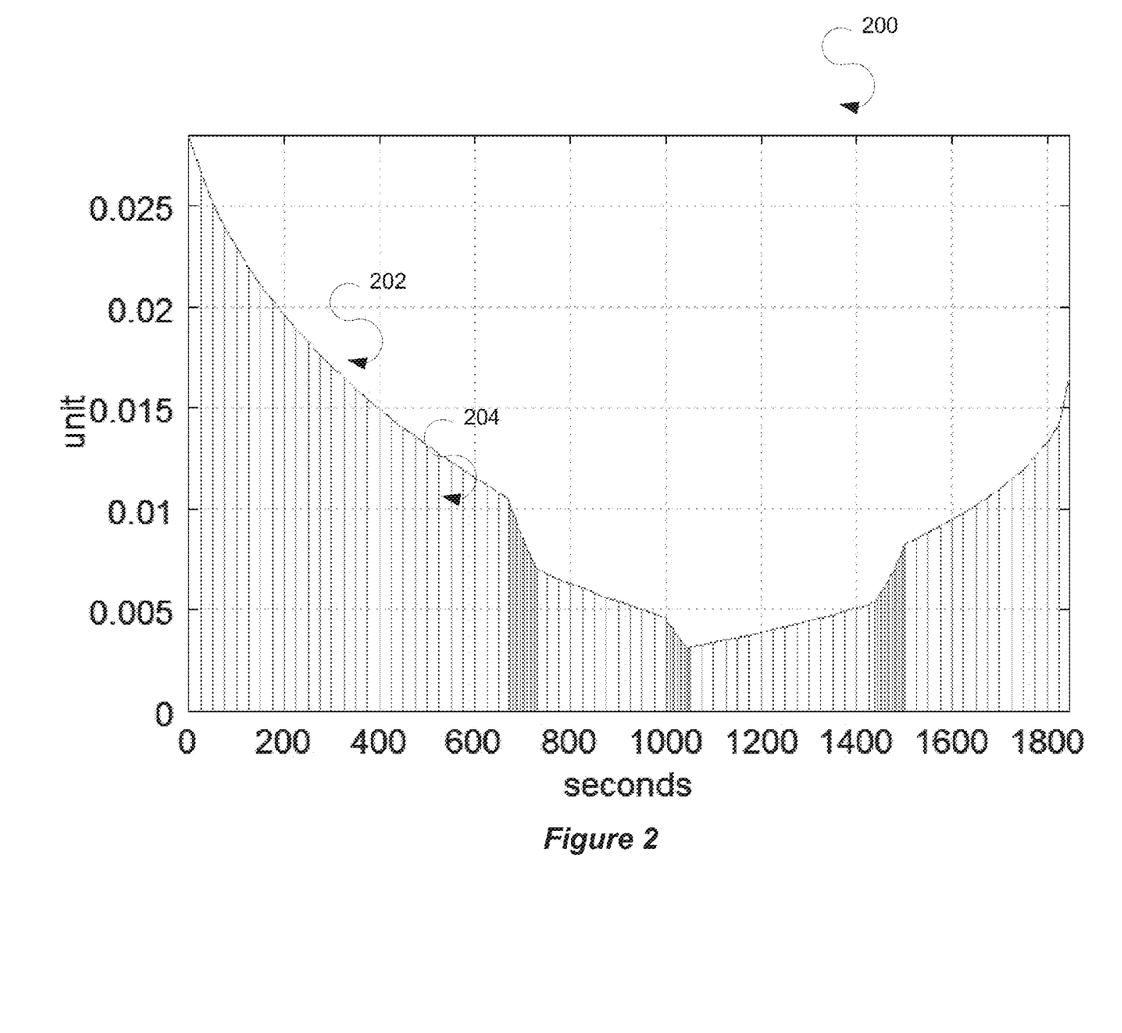
FIG. 2 also illustrates the granularity of the beacon generation points.

FIG. 2 illustrates an initial probability density 200. The initial probability density 200, which may also be called a probability density function, expresses the relative likelihood for a variable to have a particular value. Statistically distributing fewer beacons along the video length can be effectuated by utilizing the probability density 200. At the beginning of each video view session, a number of points from the finite subset are selected for beacon generation. This number represents how many beacons are permitted for each video. Users usually decide if they want to view the entire video or not during the beginning of the video, and those who do watch it usually are not interested in the credits. Accordingly, in one embodiment, beacon sending points are pseudo-randomly generated during the video views according to the probability density 200, which favors the beginning and ending of the video. The initial normalized probability density 202 is indicated as a graph along the length of the video. By being normalized, the total probability for a variable for its definition set equals 1, i.e., $\int_D \psi(x)=1$, $x \in D$ such that $\psi$ is the initial probability density 200. Further, a plurality of sampling divisions 204 indicate possible beacon generation points with varying granularity.

FIG. 2 also illustrates the granularity of the beacon generation points. The plurality of sampling divisions 204 may be adjusted depending on business requirements, e.g. a finer granularity for commercials and a less fine granularity for the actual video contents.

If mandatory beacons are not sent in the same points during the video for all views, then the resulting record will always be lower than the record because the user drops off between the last received beacon point and the next expected beacon point. Accordingly, the record consists only of the sum of the last received beacons for all views. This effect may be counteracted by trying to estimate the user's drop-off point by selecting a granularity division from the finite subset between the two beacons, which may be effectuated by randomly selecting one of the points or by utilizing the respective section of the record obtained so far as a probability density.

Figure 3:
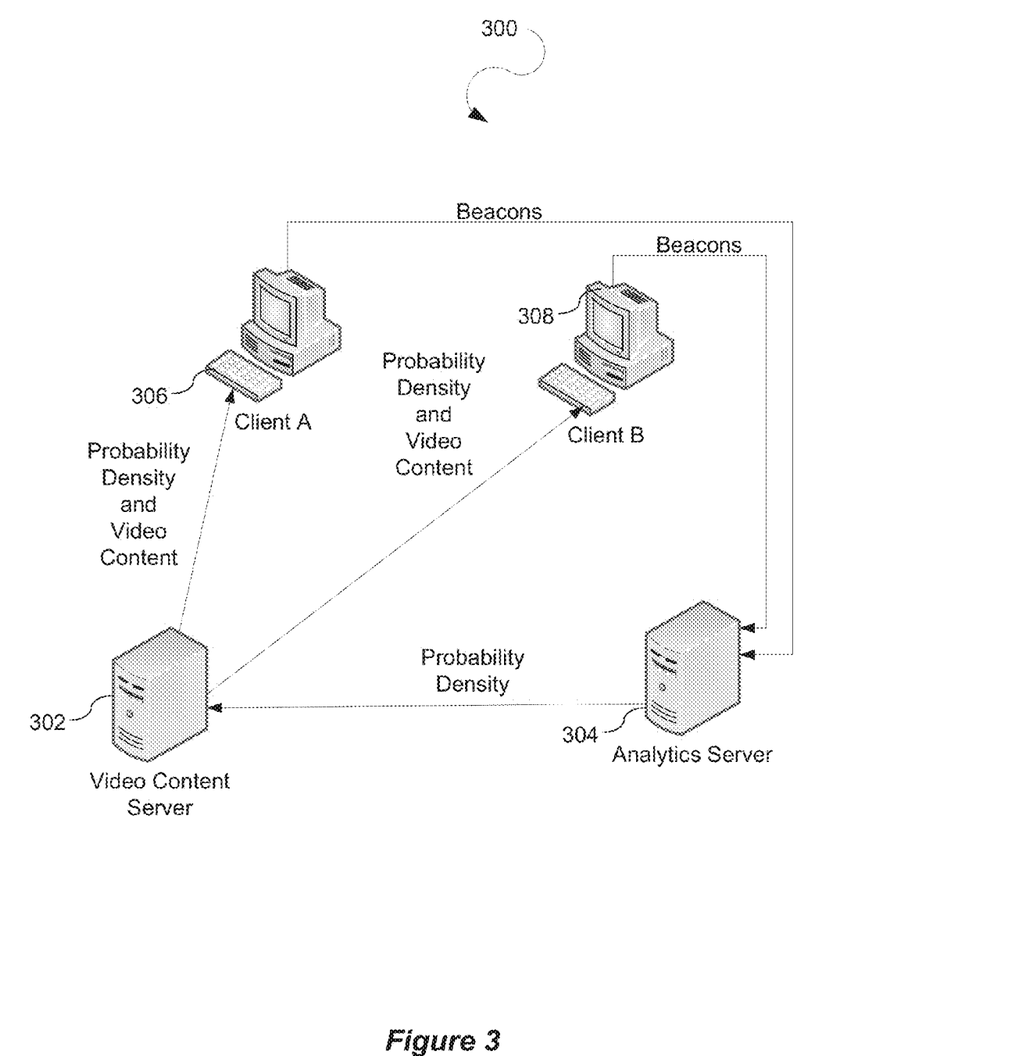
FIG. 3 illustrates a video consumption report generation architecture 300 that utilize probability densities for beacon point generation.

FIG. 3 illustrates a video consumption report generation architecture 300 that utilize probability densities for beacon point generation. The video consumption report generation architecture 300 includes a video content server 302, an analytics server 304, and a plurality of clients, e.g., client A 306 and client B 308. The video content server 302 stores the video content. Further, the analytics server 304 performs analytics on the video content sent from the video content server 302 to the plurality of clients. The analytics server 304 generates an initial granularity mapping for the video and an initial probability density. The analytics server 304 considers the video structure, e.g., content, advertisements, etc., and the duration of the video. The video content server 302 then sends the probability density along with the video content to each client in the plurality of clients. Further, each of the clients in the plurality of clients beacons according to the probability density and sends those beacons to the analytics server 304 as the user watches the video. The analytics server 304 records the beacon and the next expected beacon point. When the next expected beacon does not appear, the analytics server generates the estimated drop-off point. The plurality of clients may be computing devices, media players, media players stored on computing devices, or the like. A computing device may be a personal computer, laptop, smartphone, cellular phone, tablet device, Internet connected televisions, set top boxes, game consoles, or the like.

The video content server 302 may send the probability density and the granularity mappings as data or metadata that is utilized by code stored on the clients. Alternatively, the video content server 302 may send the probability density and the granularity mappings as code, e.g., a plug-in, a cookie, or the like that may be executed by the clients. The video content server 302 may generate such code. Alternatively, the analytics server 304 may generate such code and send it to the video content server 302. In an alternative embodiment, the analytics server 304 may send the probability density and the granularity mappings directly to the plurality of clients in any of the formats provided for herein.

In another embodiment, a playlist server may be utilized. The playlist server may provide a playlist to the video content server 302 so that the video content server may play a video from the playlist.

In yet another embodiment, the video content server 302 and the analytics server 304 may be the same server. Further, in another embodiment, the video content server 304 may perform the functions described herein, but may not store the video content. For example, a proxy server or a manifest may store the video content. In yet another embodiment, the same probability density and granularity mapping may not have to be sent to each client. For example, a first client may receive a first probability density and a first granularity mapping whereas a second client may receive a second distinct probability density and a second distinct granularity mapping.

Figure 4:
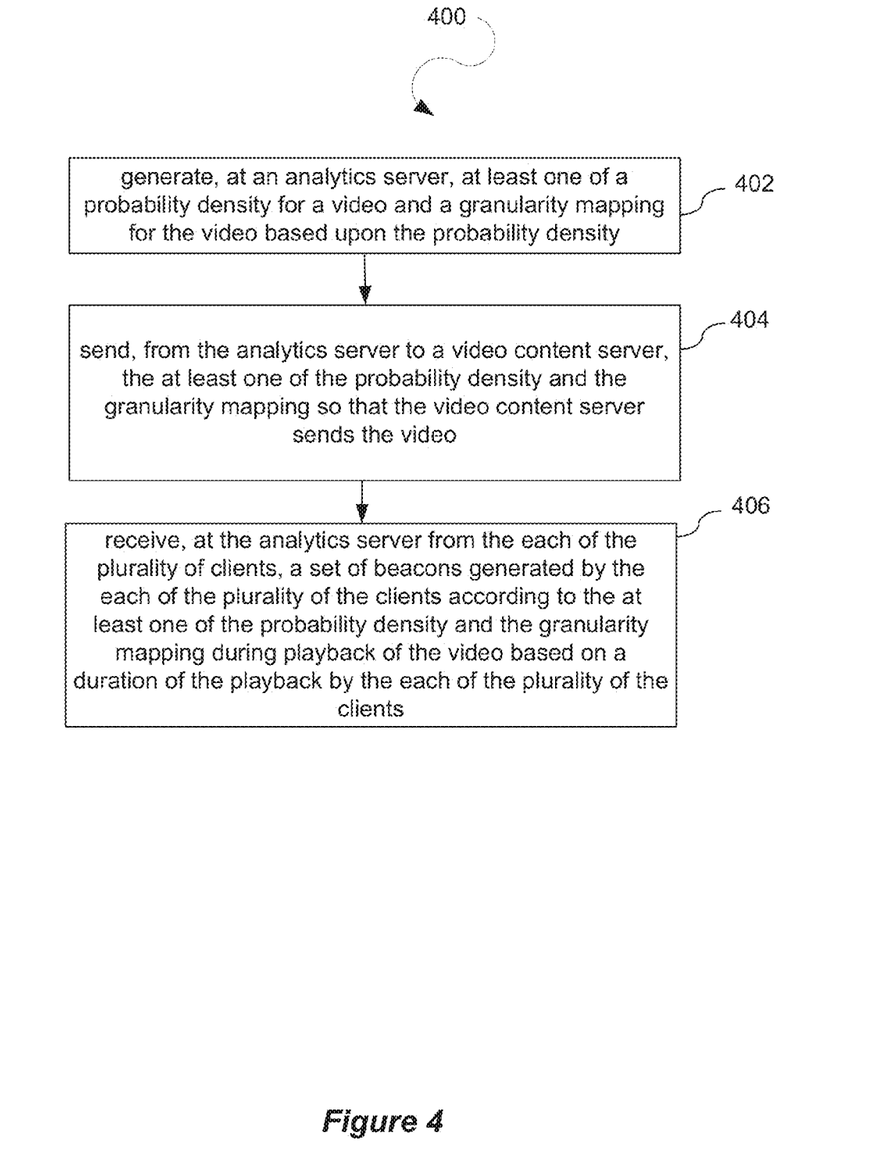
FIG. 4 illustrates a process that may be utilized to determine video consumption.

FIG. 4 illustrates a process 400 that may be utilized to determine video consumption. At a process bock 402, the process 400 generates, at an analytics server, at least one of a probability density for a video and a granularity mapping for the video based upon the probability density. The probability density is calculated according to a predetermined set of points in the video and a pseudo-randomly generated set of points in the video. The probability density is non-degenerate. In other words, the probability density expresses the probability of generating a beacon in each respective point. Some of these points may be mandatory generation points. The granularity mapping for the video provides a mapping of the probability density to the video, i.e., the granularity mapping maps the points to the video. The set of points may be generated or provided by the publisher of the video. Further, the probability density and/or the granularity mapping may be provided by the publisher of the video. In addition, at a process block 404, the process 400 sends, from the analytics server to a video content server, the at least one of the probability density and the granularity mapping so that the video content server sends the video, the probability density, and the granularity mapping to each of a plurality of clients, the video content server storing the video. At a process block 406, the process 400 also receives, at the analytics server from the each of the plurality of clients, a set of beacons generated by the each of the plurality of the clients according to the at least one of the probability density and the granularity mapping during playback of the video based on a duration of the playback by the each of the plurality of the clients.

In one embodiment, the probability density is modeled using an abstract class that defines and implements most of the functionality. All of the different strategies are implemented in classes that override a minimum number of methods. The probability density abstract class may contain the following fields: a granularity divisions mapping, a normalized probability density array, and a number of beacons. The granularity divisions mapping field has each entry corresponding to a moment in the video that predetermined considerations, e.g., business considerations, dictate consumption should be measured. Further, the normalized probability density array field has each entry representing the relative probability that a beacon would be generated in the corresponding moment from the granularity divisions mapping. A negative entry may indicate a mandatory beacon. In addition, the number of beacons field indicates the number of beacons to generate per video view. In one embodiment, the video content server serializes this object and sends it to the client along with the actual video contents. The client then generates beacon points from the granularity division subset starting with the mandatory points according to each division's relative weight. In one embodiment, the generation of the beacon points is performed at each client. In an alternative embodiment, the generation of the beacon points is performed at the video content server 302 illustrated in FIG. 3. In yet another embodiment, the generation of the beacon points is performed at the video analytics server 304 illustrated in FIG. 3.

As large drop-offs typically occur at the beginning of a video and at the end of a video, drop-off errors at the beginning and the end of the video may be minimized by favoring the beginning and the end of the video. For example, a higher frequency of beacons may be randomly generated and sent during those sections of the video than other sections of the video. Other or alternative sections, e.g., commercials, may be utilized to as points at which to provide a higher frequency of random generation of beacons. In one embodiment, a continuous curve is maintained for the probability distribution with the higher frequency random generation points.

Publishers may be more interested in the section of the consumption report occurring during the commercial breaks. Accordingly, the granularity of the beacon generation point subset may be varied to provide increased density during advertisements and decreased density during video content.

In another embodiment, the probability density may be updated according to user trends. For example, based upon an initial probability density, the analytics server 304 may determine that certain drop-off points are occurring more frequently than others. The analytics server 304 may then adjust the number of beacons based on those user trends. In other words, the initial probability density is based upon beacons being sent at certain predetermined points in the video and at certain pseudo-randomly generated points in the video, which may or may not be in proximity to the predetermined points. Upon receiving information back from the plurality of the clients, the analytics server 304 may fine tune certain areas of interest by updating the probability distribution so that more or less beacons are sent at those areas of interest. For example, if a ten second interval appears to have an unexpectedly high number of drop-offs by some of the plurality of clients, the analytics server 304 may adjust the probability density so that future view sessions by clients involve the clients sending more beacons during that ten second intervals so that the analytics server 304 can precisely determine the drop-off points in smaller and more precise intervals. This configuration may be utilized with an initial probability distribution that has beacons that are completely predetermined, beacons that are completely pseudo-randomly generated, or a set of beacons that includes predetermined beacons and pseudo-randomly generated beacons.

Figure 5:
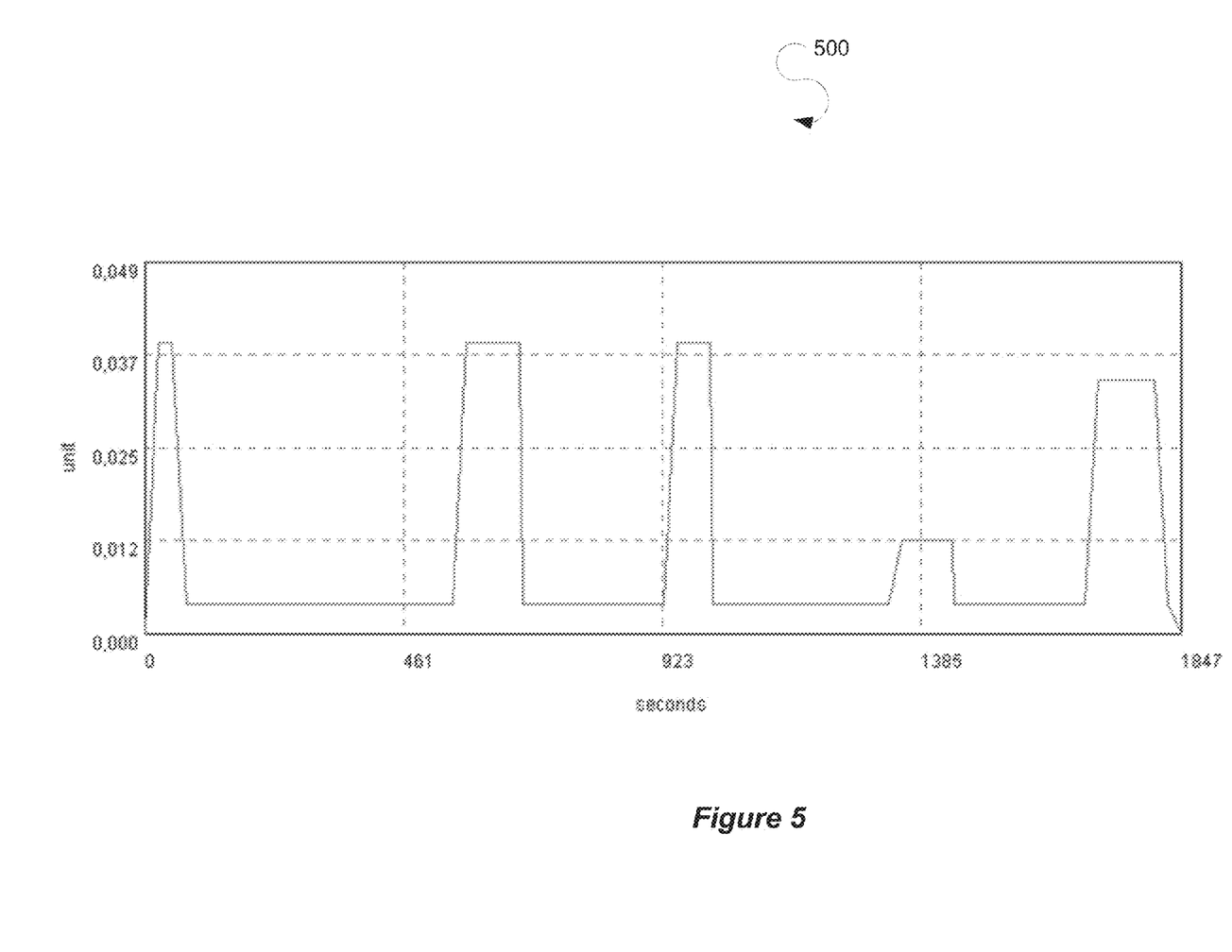
FIG. 5 illustrates a subsequent probability density that is generated based on the derivative of a partial sampling session record.

FIG. 5 illustrates a subsequent probability density 300 that is generated based on the derivative of a partial sampling session record. After a stable record is determined according to the initial probability density 200 illustrated in FIG. 2, the subsequent probability density 300 that favors the sampling of sections of the video where the partial record for the current sampling session has a high derivative in absolute value may be generated. A slowly varying partial record graph section means that few users are dropping off during that section. In such slowly varying partial record graph sections, fewer beacons may be sent. Those beacons may have large intervals between them because the small number of users that drop off will keep the total error low. Conversely, a higher frequency of beacons is sent for rapidly varying graph sections to minimize the error.

The exact video view drop-off occurs between two consecutive beacon generation points. Each beacon includes the time in the video in which it was generated and the next expected beacon trigger point. When the next expected beacon for a certain session is overdue, the drop-off may be estimated by selecting a pseudo-random point from the finite point subset by utilizing the derivative of the corresponding section of either the general record or the partial record as a probability density. The sum of all the estimates may be considered as an approximation of the actual record, which is obtained by sending beacons in every point specified by the initial granularity.

Figure 6:
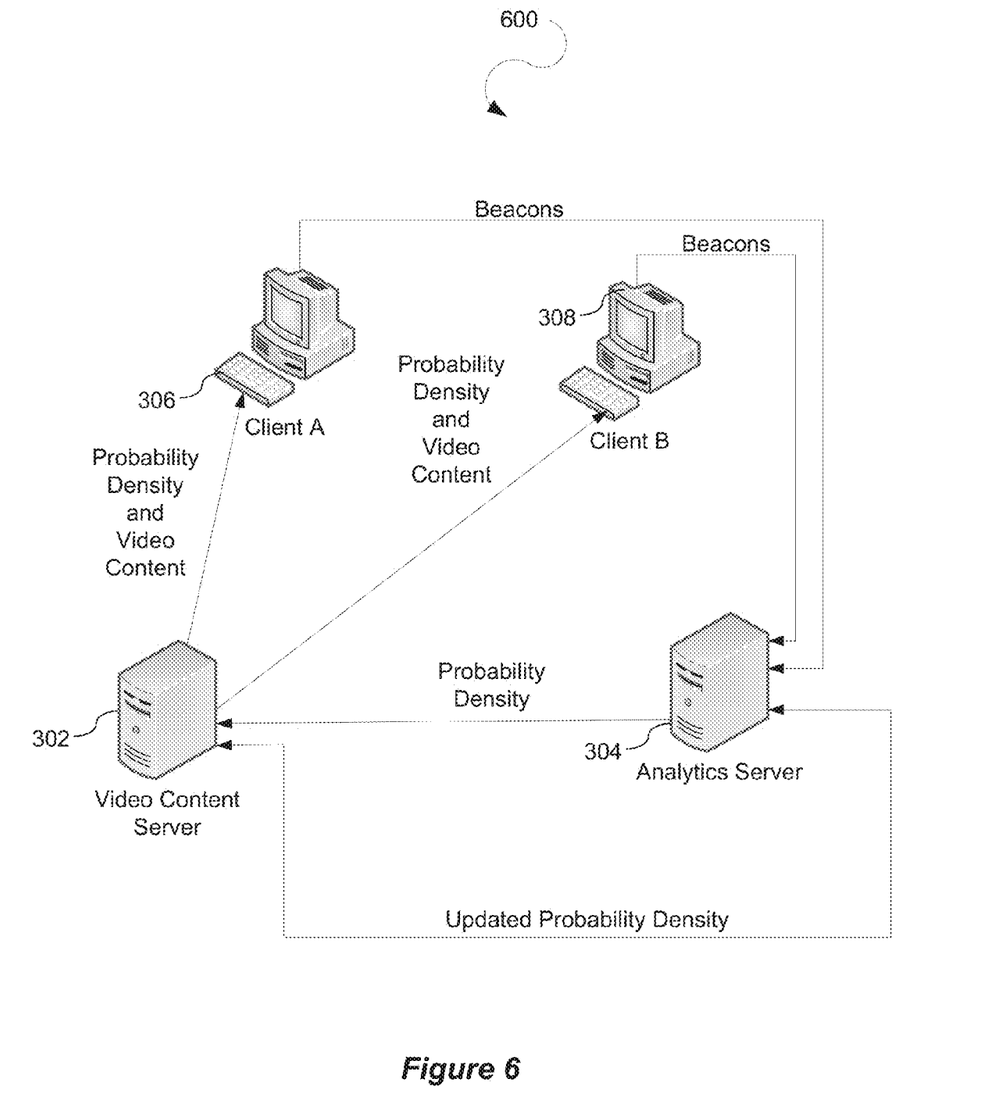
FIG. 6 illustrates a video consumption report generation architecture that utilizes probability densities for beacon point generation.

FIG. 6 illustrates a video consumption report generation architecture 600 that utilizes probability densities for beacon point generation. The video consumption report generation architecture 600 is similar to the video consumption report generation architecture 300, but also provides an updated probability density from the analytics server 304 to the video content server 302. Further, the probability density does not have to be non-degenerate. In addition, the probability density does not have to utilize randomly points for beacon generation.

Once a sampling session is terminated, the analytics server 304 may add a partial record to a general record, update the probability density, and update the number of beacons to generate per video view, and/or update the number of video view sessions per sampling session. The analytics server 304 may then proceed to initialize a new sampling session and continue the process for the new sampling session in a loop.

Any of the configurations provided for herein may utilize a minimum number of beacons and/or a maximum number of beacons to ensure that load on the analytics server 304 is kept small. Further, the analytics server 304 in any of the configurations provided for herein may perform calculations on the fly to change the number of beacons utilized.

Figure 7:
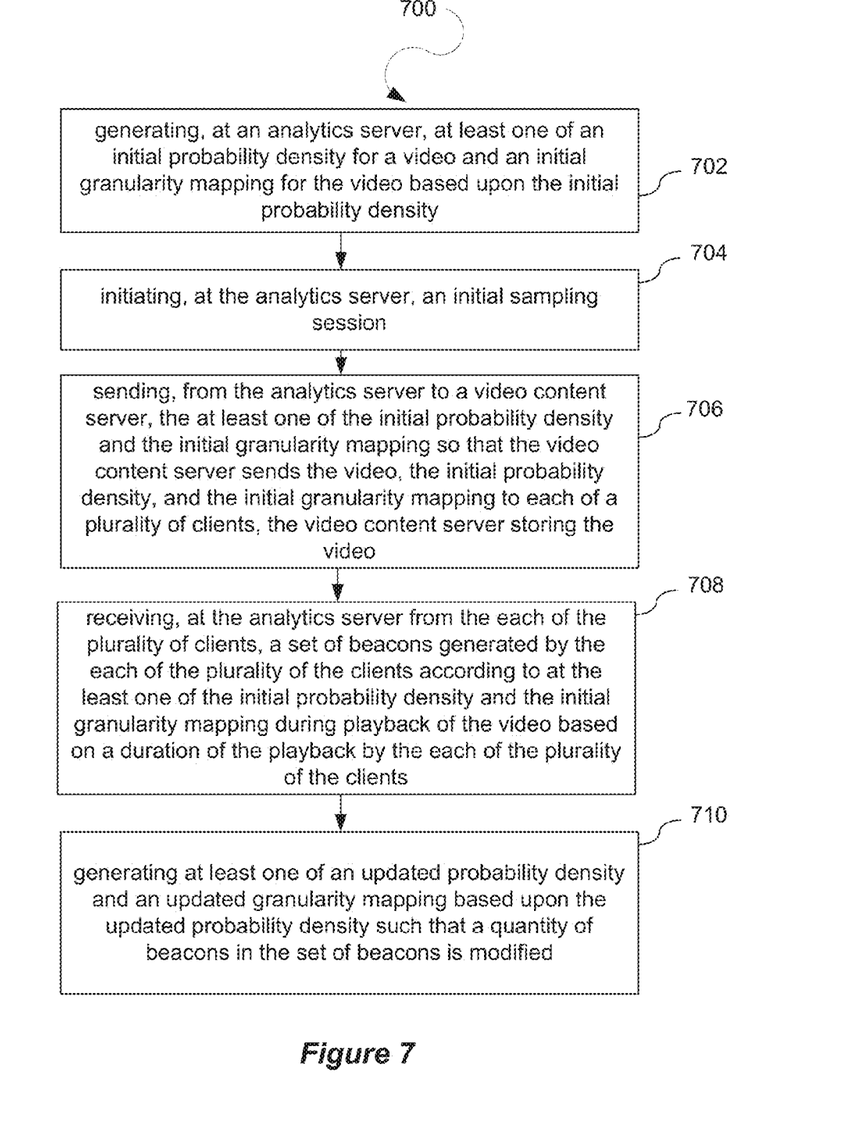
FIG. 7 illustrates a process that may be utilized to update a quantity of beacons to determine video consumption.

FIG. 7 illustrates a process 700 that may be utilized to update a quantity of beacons to determine video consumption. At a process block 702, the process 700 generates, at an analytics server, at least one of an initial probability density for a video and an initial granularity mapping for the video based upon the initial probability density. The initial probability density is calculated according to a set of points in the video. The initial granularity mapping for the video provides a mapping of the initial probability density to the video. Further, at a process block 704, the process 700 initiates, at the analytics server, an initial sampling session. In addition, at a process block 706, the process 700 sends, from the analytics server to a video content server, the at least one of the initial probability density and the initial granularity mapping so that the video content server sends the video and the at least one of the initial probability density and the initial granularity mapping to each of a plurality of clients, the video content server storing the video. At a process block 708, the process 700 also receives, at the analytics server from the each of the plurality of clients, a set of beacons generated by the each of the plurality of the clients according to the initial probability density and the initial granularity mapping during playback of the video based on a duration of the playback by the each of the plurality of the clients. Further, at a process block 710, the process 700 generates at least one of an updated probability density and an updated granularity mapping based upon the updated probability density such that a quantity of beacons in the set of beacons is modified. In one embodiment, the analytics server or a processor performs the updating of the probability density.

Figure 8:
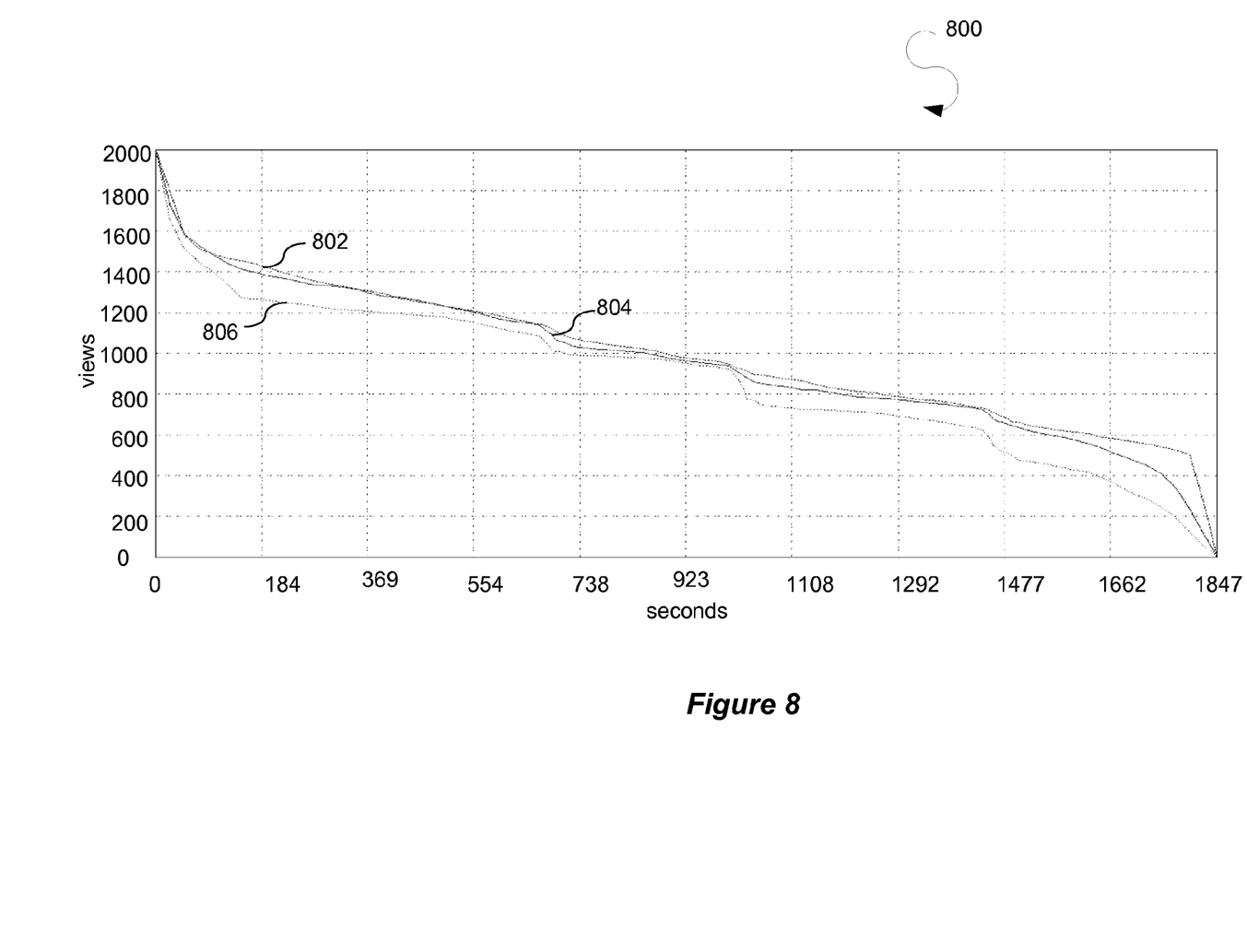
FIG. 8 illustrates an example of a graph generated according to the process 700 illustrated in FIG. 7.

FIG. 8 illustrates an example of a graph 800 generated according to the process 700 illustrated in FIG. 7. The graph 802 indicates an ideal video view record, which may be obtained by sending beacons every five seconds. Further, the graph 804 indicates a record according to the last received beacons. In addition, the graph 806 indicates an estimate record that estimates the ideal record.

Figure 9:
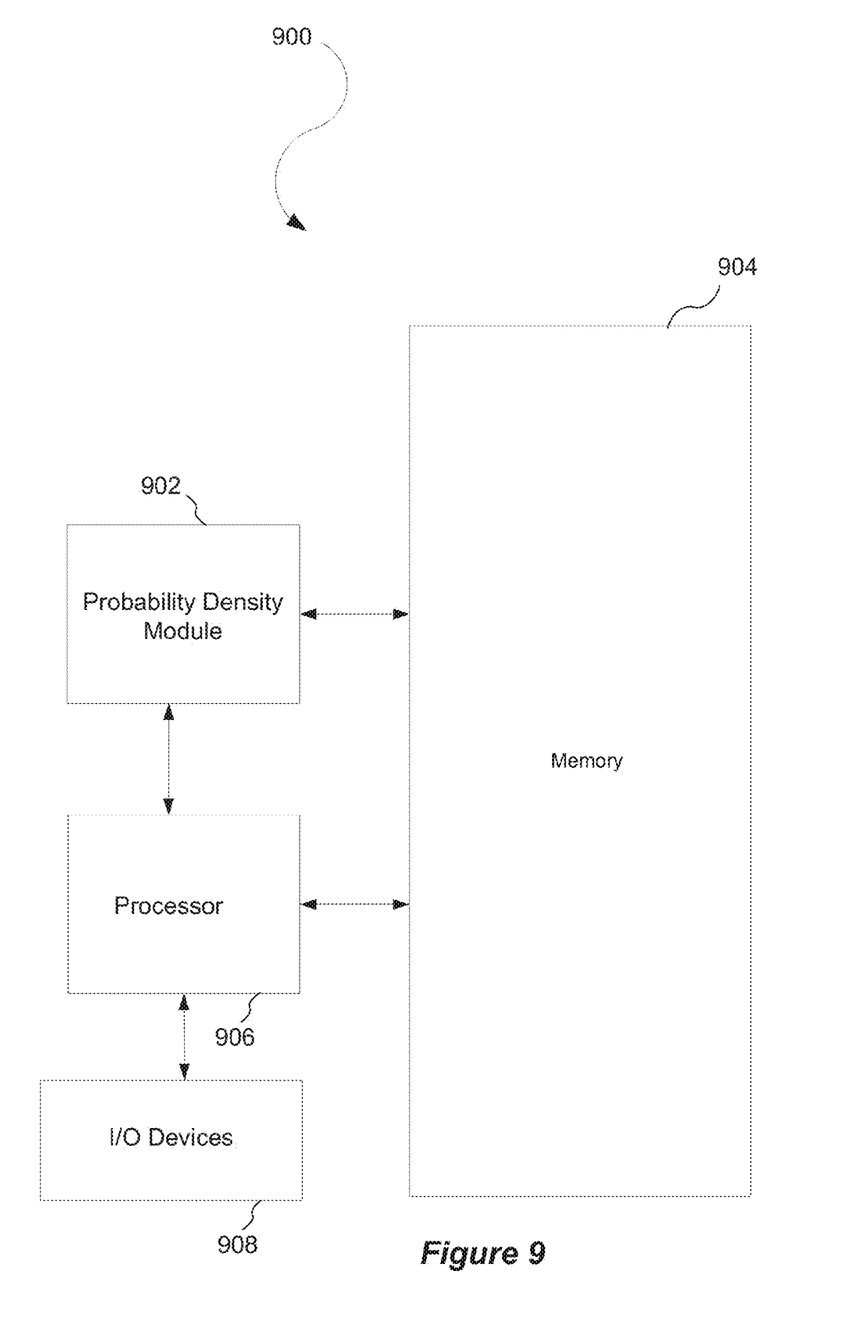
FIG. 9 illustrates a system configuration that may be utilized to generate a probability density for any of the configurations provided for herein.

FIG. 9 illustrates a system configuration 900 that may be utilized to generate a probability density for any of the configurations provided for herein. In one embodiment, a probability density module 902 interacts with a memory 904 and a processor 906. In one embodiment, the system configuration 906 is suitable for storing and/or executing program code and is implemented using a general purpose computer or any other hardware equivalents. The processor 906 is coupled, either directly or indirectly, to the memory 904 through a system bus. The memory 904 can include local memory employed during actual execution of the program code, bulk storage, and/or cache memories which provide temporary storage of at least some program code in order to reduce the number of times code must be retrieved from bulk storage during execution.

The Input/Output ("I/O") devices 908 can be coupled directly to the system configuration 900 or through intervening input/output controllers. Further, the I/O devices 908 may include a keyboard, a keypad, a mouse, a microphone for capturing speech commands, a pointing device, and other user input devices that will be recognized by one of ordinary skill in the art. Further, the I/O devices 908 may include output devices such as a printer, display screen, or the like. Further, the I/O devices 908 may include a receiver, transmitter, speaker, display, image capture sensor, biometric sensor, etc. In addition, the I/O devices 908 may include storage devices such as a tape drive, floppy drive, hard disk drive, compact disk ("CD") drive, etc. Any of the modules described herein may be single monolithic modules or modules with functionality distributed in a cloud computing infrastructure utilizing parallel and/or pipeline processing. The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above.

It should be understood that the processes and systems described herein can take the form of entirely hardware embodiments, entirely software embodiments, or embodiments containing both hardware and software elements. If software is utilized to implement the method or system, the software can include but is not limited to firmware, resident software, microcode, etc. It is understood that the processes and systems described herein may also be applied in other types of processes and systems. Those skilled in the art will appreciate that the various adaptations and modifications of the embodiments of the processes and systems described herein may be configured without departing from the scope and spirit of the present processes, systems, and computer program products. Therefore, it is to be understood that, within the scope of the appended claims, the present processes, systems, and computer program products may be practiced other than as specifically described herein.

We claim:

1. A computer program product comprising a computer useable non-transitory medium having a computer readable program, wherein the computer readable program when executed on a computer causes the computer to:
   generate, at an analytics server, at least one of a probability density for a video and a granularity mapping for the video based upon the probability density, the probability density being calculated according to a predetermined set of points in the video and a pseudo-randomly generated set of points in the video, the probability density being non-degenerate, the granularity mapping for the video providing a mapping of the probability density to the video;
   send, from the analytics server to a video content server, the at least one of the probability density and the granularity mapping so that the video content server sends the video and the at least one of the probability density and the granularity mapping to each of a plurality of clients, the video content server storing the video; and
   receive, at the analytics server from the each of the plurality of clients, a set of beacons generated by the each of the plurality of the clients according to the at least one of the probability density and the granularity mapping during playback of the video based on a duration of the playback by the each of the plurality of the clients.

2. The computer program product of claim 1, wherein the computer is further caused to estimate, at the analytics server, a drop-off point of one of the plurality of clients during the playback by recording a last point at which a last received beacon from the set of beacons is received, determining a next point at which a next beacon is expected to be received, and estimating a time in between the next point and the last point if the next beacon is not received.

3. The computer program product of claim 2, wherein the computer is further caused to calculate, at the analytics server, a maximum drop-off error by determining a maximum value difference between endpoints of an interval of the sampling session and the drop-off point.

4. The computer program product of claim 2, wherein the computer is further caused to generate an updated probability density based on a partial beacon record and an updated granularity mapping based on the updated probability density such that an updated set of beacons is generated by the each of the plurality of the clients according to the updated probability density and the updated granularity mapping during playback of the video based on a subsequent duration of the playback by the each of the plurality of the clients.

5. The computer program product of claim 1, wherein the computer is further caused to calculate the pseudo-randomly generated set of points in the video by performing random generation of a majority of the pseudo-randomly generated set of points in proximity to the predetermined set of points in the video.

6. The computer program product of claim 1, wherein the predetermined set of points in the video is selected from the group consisting of a beginning of the video, an end of the video, and an advertisement in the video.

7. The computer program product of claim 1, wherein the set of beacons is a set of notifications.

8. A method comprising:
   generating, at an analytics server, at least one of a probability density for a video and a granularity mapping for the video based upon the probability density, the probability density being calculated according to a predetermined set of points in the video and a pseudo-randomly generated set of points in the video, the probability density being non-degenerate, the granularity mapping for the video providing a mapping of the probability density to the video;
   sending, from the analytics server to a video content server, the at least one of the probability density and the granularity mapping so that the video content server sends the video and the at least one of the probability density and the granularity mapping to each of a plurality of clients, the video content server storing the video; and
   receiving, at the analytics server from the each of the plurality of clients, a set of beacons generated by the each of the plurality of the clients according to the at least one of the probability density and the granularity mapping during playback of the video based on a duration of the playback by the each of the plurality of the clients.

9. The method of claim 8, further comprising estimating, at the analytics server, a drop-off point of one of the plurality of clients during the playback by recording a last point at which a last received beacon from the set of beacons is received, determining a next point at which a next beacon is expected to be received, and estimating a time in between the next point and the last point if the next beacon is not received.

10. The method of claim 9, further comprising calculating, at the analytics server, a maximum drop-off error by determining a maximum value difference between endpoints of an interval of the sampling session and the drop-off point.

11. The method of claim 9, wherein the computer is further caused to generate an updated probability density based on a partial beacon record and an updated granularity mapping based on the updated probability density such that an updated set of beacons is generated by the each of the plurality of the clients according to the updated probability density and the updated granularity mapping during playback of the video based on a subsequent duration of the playback by the each of the plurality of the clients.

12. The method of claim 8, further comprising calculating the pseudo-randomly generated set of points in the video by performing random generation of a majority of the pseudo-randomly generated set of points in proximity to the predetermined set of points in the video.

13. The method of claim 8, wherein the predetermined set of points in the video is selected from the group consisting of a beginning of the video, an end of the video, and an advertisement in the video.

14. The method of claim 8, wherein the set of beacons is a set of notifications.

15. A system comprising:
  a processor that generates at least one of a probability density for a video and a granularity mapping for the video based upon the probability density, the probability density being calculated according to a predetermined set of points in the video and a pseudo-randomly generated set of points in the video, the probability density being non-degenerate, the granularity mapping for the video providing a mapping of the probability density to the video;
  a transmission module that sends the at least one of the probability density and the granularity mapping to a video content server so that the video content server sends the video and the at least one of the probability density and the granularity mapping to each of a plurality of clients, the video content server storing the video; and
  a reception module that receives, from the each of the plurality of clients, a set of beacons generated by the each of the plurality of clients according to the at least one of the probability density and the granularity mapping during playback of the video based on a duration of the playback by the each of the plurality of the clients.

16. The system of claim 15, wherein the processor estimates, a drop-off point of one of the plurality of clients during the playback by recording a last point at which a last received beacon from the set of beacons is received, determining a next point at which a next beacon is expected to be received, and estimating a time in between the next point and the last point if the next beacon is not received.

17. The system of claim 16, wherein the processor calculates, a maximum drop-off error by determining a maximum value difference between endpoints of an interval of the sampling session and the drop-off point.

18. The system of claim 16, wherein the processor generates an updated probability density based on a partial beacon record and an updated granularity mapping based on the updated probability density such that an updated set of beacons is generated by the each of the plurality of the clients according to the updated probability density and the updated granularity mapping during playback of the video based on a subsequent duration of the playback by the each of the plurality of the clients.

19. The system of claim 16, wherein the processor calculates the pseudo-randomly generated set of points in the video by performing random generation of a majority of the pseudo-randomly generated set of points in proximity to the predetermined set of points in the video.

20. The system of claim 16, wherein the predetermined set of points in the video is selected from the group consisting of a beginning of the video, an end of the video, and an advertisement in the video.

21. A computer program product comprising a computer useable non-transitory medium having a computer readable program, wherein the computer readable program when executed on a computer causes the computer to:
  generate, at an analytics server, at least one of a probability density for a video and a granularity mapping for the video based upon the probability density, the probability density being calculated according to a predetermined set of points in the video and a pseudo-randomly generated set of points in the video, the probability density being non-degenerate, the granularity mapping for the video providing a mapping of the probability density to the video;
  send, from the analytics server to each of a plurality of clients, the at least one of the probability density and the granularity mapping; and
  receive, at the analytics server from the each of the plurality of clients, a set of beacons generated by the each of the plurality of clients according to the at least one of the probability density and the granularity mapping during playback of the video based on a duration of the playback by the each of the plurality of the clients.

* * * * *